United States Patent [19]

Yamano et al.

[11] Patent Number: 4,775,786
[45] Date of Patent: Oct. 4, 1988

[54] BAR CODE LABEL

[75] Inventors: Minoru Yamano, Ibaraki; Akio Harada, Osaka, both of Japan

[73] Assignee: Daiken Kagaku Kogyo Kabushiki Kaisha, Osaka, Japan

[21] Appl. No.: 123,070
[22] PCT Filed: Mar. 3, 1987
[86] PCT No.: PCT/JP87/00133
§ 371 Date: Dec. 3, 1987
§ 102(e) Date: Dec. 3, 1987
[87] PCT Pub. No.: WO87/05424
PCT Pub. Date: Sep. 11, 1987

[30] Foreign Application Priority Data

Mar. 3, 1986 [JP] Japan .................................. 61-30236

[51] Int. Cl.$^4$ ............................................ G06K 19/06
[52] U.S. Cl. .................................. 235/490; 235/468; 235/487
[58] Field of Search ........................ 235/468, 490, 487

[56] References Cited

U.S. PATENT DOCUMENTS 4,230,266 10/1980 Juvinall .............................. 235/490

Primary Examiner—Harold I. Pitts
Attorney, Agent, or Firm—Larson and Taylor

[57] ABSTRACT

A bar code label comprising a bar code which is made from a vitreous material. The label is formed on a substrate made of ceramics, pottery or porcelain enamel-coated metal or the like.

7 Claims, 1 Drawing Sheet

BAR CODE LABEL

TECHNICAL FIELD

The present invention relates to bar code labels outstanding in heat resistance and chemical resistance.

TECHNICAL FIELD

In recent years, bar codes are widely used for automation of commodity distribution control, stock control, sales control and the like. Various attempts have been made to introduce into a production site a system for performing production control, quality control and the like using this bar code.

Such control system in plants is conducted as follows. A printed bar code paper label is attached to products running on a production line, the bar code is read at each operation location, specific operation is carried out according to the information on working schedules preset in a host computer, and results on production and on inspection obtained according to the information stored in bar codes are transmitted to the host computer in order to accomplish, on a real-time basis, quality control and production control over the entire area of the plant.

However, for example, conventional bar code labels of the paper-based type can not be used at a diffusion procedure in the production of semiconductors at which a product is treated in various corrosive atmospheres at high temperatures of approximately 500° to 1000° C. The same problem arises in various procedures other than the diffusion for semiconductors such as firing of ceramics and glass or porcelain ware. Conventional bar code labels usable at such high temperatures include one prepared by treating an aluminum substrate with Alumite to print a bar code pattern. This bar code label, however, is usable only at about 500° C. or lower and exhibits a poor durability in a highly corrosive atmosphere.

DISCLOSURE OF THE INVENTION

In view of the foregoing prior art problems, we conducted extensive research to obtain bar code labels excellent in high-temperature durability, chemical resistance and other properties. Our research has revealed that a bar code label high in high-temperature durability and chemical resistance can be obtained by forming a bar code from a vitreous material excellent in heat resistance and chemical resistance on a substrate outstanding in heat resistance, chemical resistance and the like such as ceramics, pottery, porcelain enamel-coated metal or the like. Based on this finding, the present invention has been accomplished.

The present invention provides a bar code label comprising a bar code which is made from a vitreous material and which is formed on a substrate made of ceramics, pottery, porcelain enamel-coated metal or the like.

Substrates to be used for the bar code labels of the present invention are required to be outstanding in high-temperature heat resistance, chemical resistance and the like. Suitable examples thereof are porcelain enamel-coated metal comprising a metal having a fired glaze layer, ceramics and pottery. The substrate is usually used in the shape of a plate but is not limited thereto. For example, the substrate may be in the form of flexible cloth or paper made of, e.g. ceramics fibers of alumina or like material. Of these substrates, porcelain enamel-coated metal has further advantages of being resistant to impact and unlikely to readily break.

For formation of a bar code on a substrate, a vitreous material is used in order to produce a pattern excellent in heat resistance, chemical resistance and the like. Useful vitreous materials are not limited only to those in completely amorphous state, but even those incomplete in amorphous form, e.g. those in a sintered state, are usable insofar as they are high in heat resistance, chemical resistance and the like. While vitreous materials having a definite color themselves can be used as they are, transparent vitreous materials may be made usable by dispersing a suitable pigmen therein. Included among such vitreous materials is a reaction product of acidic oxide and basic oxide. Examples of acidic oxide compounds are silicon oxide, boric acid, phosphoric acid and the like. Examples of basic oxide compounds are carbonates or oxides of Na, K, Ca, Mg, Ba, Sn, Pb, Zn, Sb, Al or the like. Although inclusive of colored ones, the reaction products, when required, can be colored with iron oxide, manganese oxide, copper oxide or like metallic compounds or may be given a desired color by being mixed with a metallic oxide-type pigment containing at least one of NiO, $Cr_2O_3$, CoO, $Fe_2O_3$, $MnO_2$, $TiO_2$, $UO_2$ and the like. Examples thereof are glazes for pottery, coloring materials for glass ware, etc. Vitreous materials for the bar code of the present invention are not limited to the examples described above and may be suitably selected from known materials according to the temperature and atmosphere in which the bar code is used.

The colors of substrate and vitreous material are not specifically limited, but are required to make sharp the contrast between the substrate and the bar code. For example, if a substrate having a white or whitish color is used, it is preferred to use a vitreous material having a black or blackish color. Reversely a black or blackish substrate is preferably used in combination with a white or whitish vitreous material.

The bar code label of the present invention is produced, for example, by the following process. First, the required pattern is formed on a substrate from a glaze or a coloring material by methods such as screen process printing, transfer, drawing by hand or the like. Then the pattern formed on the substrate is heated for firing under suitable conditions depending on the glaze or coloring material used. The bar code label thus obtained has the bar code formed from the vitreous material on the substrate and is remarkable in heat resistance and chemical resistance.

The bar code label of the present invention can be used as attached directly to an article or to a pallet on which the article is placed.

INDUSTRIAL FEASIBILITY

Figure 1:
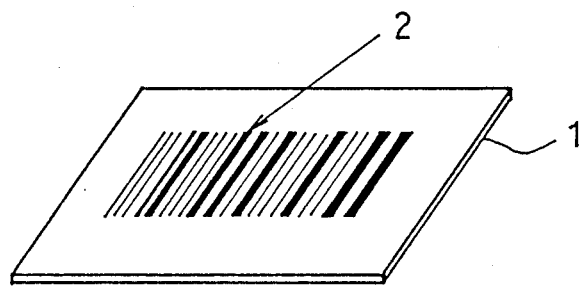
FIG. 1 is a perspective view showing an embodiment of the bar code label of the present invention.

The bar code label of the present invention is outstanding in heat resistance, chemical resistance and the like and is suitable for use in the control of articles to be treated at high temperatures and/or in corrosive atmospheres. The attachment of the bar code label facilitates the quality control and production control under conditions under which conventional bar code labels have not been usable. Also the use of such bar code labels makes it possible to automate mixed production lines for manufacture of various kinds of articles each in small quantities.

EXAMPLES

The present invention will be described below with reference to the following Examples.

EXAMPLE 1

On a substrate 1 made of 96% alumina and measuring 5.08 cm×1.7 cm×0.8 cm was printed a bar code pattern by a screen printing machine from a pasty black glaze prepared by kneading and dispersing the following components by a roll mill.

| Composition of paste for bar code | |
| --- | --- |
| $Fe_2O_3$ | 14 parts by weight |
| $CrO_2$ | 4 parts by weight |
| $MnO_2$ | 17 parts by weight |
| CoO | 28 parts by weight |
| Kaolin | 8 parts by weight |
| Ethyl cellulose | 10 parts by weight |
| Butyl cellosolve acetate | 21 parts by weight |

Subsequently the printed substrate was fired at 1200° to 1300° C. for 10 minutes during which no printed pattern fluidized. In this way, a bar code 2 having a sufficient contrast was produced.

The substrate and print of the bar code label thus obtained were high in heat resistance and chemical resistance and was one effectively usable even at a high temperature of about 1000° C. and in a corrosive atmosphere.

EXAMPLE 2

A black pigment containing predominant amounts of $Fe_2O_3$, $SiO_2$, $Al_2O_3$, $TiO_2$, $MnO_2$ and $MgO_2$ was mixed with a borosilicate glass frit powder to make a paste. A bar code pattern was printed from the paste on an alumina substrate of the type used in Example 1. The printed substrate was fired at 1100° C. for 10 minutes, providing a bar code with a clear contrast.

The bar code label thus obtained underwent no change even when immersed in each of 37% HCl, 95.6% $H_2SO_4$, 69% $HNO_3$ and 10% NaOH at room temperature for 1 month or longer.

| Composition of paste for bar code | |
| --- | --- |
| Pigment ($Fe_2O_3$, $SiO_2$, $Al_2O_3$, $TiO_2$, $MnO_2$ and $MgO_2$) | 40 parts by weight |
| Borosilicate glass frit powder | 36 parts by weight |
| Ethyl cellulose | 12 parts by weight |
| Terpinol | 12 parts by weight |

EXAMPLE 3

A blue pigment (CoO) alone was made into a paste. A bar code pattern was printed on a 99.5% alumina substrate after which the printed substrate was fired at 500° C. for 10 minutes. The CoO component was mixed with the $Al_2O_3$ component in the substrate material to form a vitrified mixture, whereby a bar code pattern was provided on the substrate. The bar code label thus produced was found to have a sufficient heat resistance at 1400° C.

| Composition of paste for bar code | |
| --- | --- |
| Pigment (CoO) | 70 parts by weight |
| Ethyl cellulose | 20 parts by weight |
| Terpinol | 10 parts by weight |

EXAMPLE 4

A mixture of white pigment ($TiO_2$) and lead borosilicate glass frit powder was made into a paste. A bar code pattern was printed on a transfer paper for pottery (paper coated with dextrin) and dried. Thereafter an overcoat was printed on the transfer paper and dried. The bar code pattern was peeled off in water and transferred onto a blackish blue substrate of porcelain enamel-coated metal. The substrate with the bar code pattern so transferred was fired at 600° C. for 10 minutes, and formed with the bar code pattern having a white portion with a black background. The bar code label was immersed in 69% $HNO_3$ at room temperature for 1 month or longer but no change was detected.

| Composition of paste for bar code | |
| --- | --- |
| Pigment ($TiO_2$) | 35 parts by weight |
| Borosilicate glass frit powder | 35 parts by weight |
| Ethyl cellulose | 15 parts by weight |
| Terpinol | 15 parts by weight |

We claim:

1. A bar code label comprising a bar code which is made from a vitreous material and which is formed on a substrate made of ceramics, pottery, porcelain enamel-coated metal or the like.

2. A bar code label according to claim 1 wherein the vitreous material is amorphous.

3. A bar code label according to claim 1 wherein the vitreous material is in a sintered state.

4. A bar code label according to claim 1 wherein the substrate is so combined with the vitreous material as to make sharp the contrast between the substrate and the bar code.

5. A bar code label according to claim 1 wherein the substrate has a white or whitish color and the vitreous material has a black or blackish color.

6. A bar code label according to claim 1 wherein the substrate has a black or blackish color and the vitreous material has a white or whitish color.

7. A bar code label according to claim 1 wherein the bar code is formed by reaction between the substrate component and the coating material component.

* * * * *